United States Patent
Liu et al.

(10) Patent No.: US 8,016,449 B2
(45) Date of Patent: Sep. 13, 2011

(54) SURFACE LIGHT EMITTING APPARATUS EMITTING LASER LIGHT

(75) Inventors: Xinbing Liu, Acton, MA (US); Janet Milliez, Somerville, MA (US); Kouki Ichihashi, Osaka (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 12/404,814

(22) Filed: Mar. 16, 2009

(65) Prior Publication Data
US 2009/0237915 A1 Sep. 24, 2009

Related U.S. Application Data

(60) Provisional application No. 61/038,253, filed on Mar. 20, 2008.

(51) Int. Cl.
*G09F 13/04* (2006.01)

(52) U.S. Cl. .................... 362/97.3; 362/97.1

(58) Field of Classification Search ............... 362/97.1, 362/97.2, 97.3, 611, 612
See application file for complete search history.

(56) References Cited

U.S. PATENT DOCUMENTS

| | | | |
|---|---|---|---|
| 5,237,367 A | 8/1993 | Kudo | |
| 7,740,392 B2 | 6/2010 | Itoh et al. | |
| 2006/0072339 A1* | 4/2006 | Li et al. | 362/608 |
| 2007/0273810 A1 | 11/2007 | Lee et al. | |
| 2009/0109658 A1* | 4/2009 | Karakawa | 362/97.2 |
| 2009/0109706 A1* | 4/2009 | Hsu | 362/611 |
| 2009/0237766 A1 | 9/2009 | Liu et al. | |

FOREIGN PATENT DOCUMENTS

| | | |
|---|---|---|
| JP | 3-198023 | 8/1991 |
| JP | 10-241418 | 9/1998 |
| JP | 2001-345008 | 12/2001 |
| JP | 2003-297127 | 10/2003 |
| JP | 2006-47422 | 2/2006 |
| JP | 2006-190647 | 7/2006 |

* cited by examiner

*Primary Examiner* — David V Bruce
(74) *Attorney, Agent, or Firm* — Hamre, Schumann, Mueller & Larson, P.C.

(57) ABSTRACT

A surface light emitting apparatus capable of providing uniform illumination while efficiently using a laser light. The apparatus comprises a light source section that includes at least one light source which emits laser beam; an optical guiding section that guides from an incidence surface of the optical guiding section the laser beam emitted from the light source section and emits the laser beam from a radiation surface of the optical guiding section; and an optical element section that includes at least one beam shaping optical element with a powered surface which converts an intensity distribution of the laser beam emitted from the light source section at the incidence surface of the optical guiding section to a uniform intensity distribution.

7 Claims, 13 Drawing Sheets

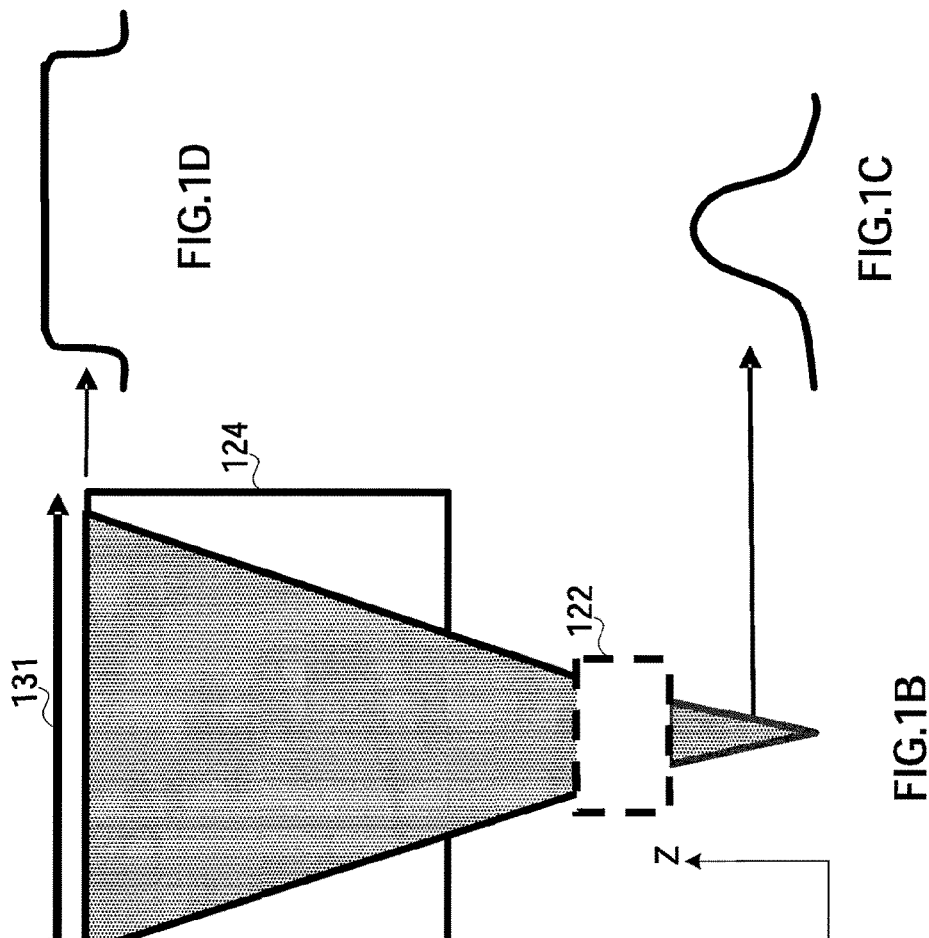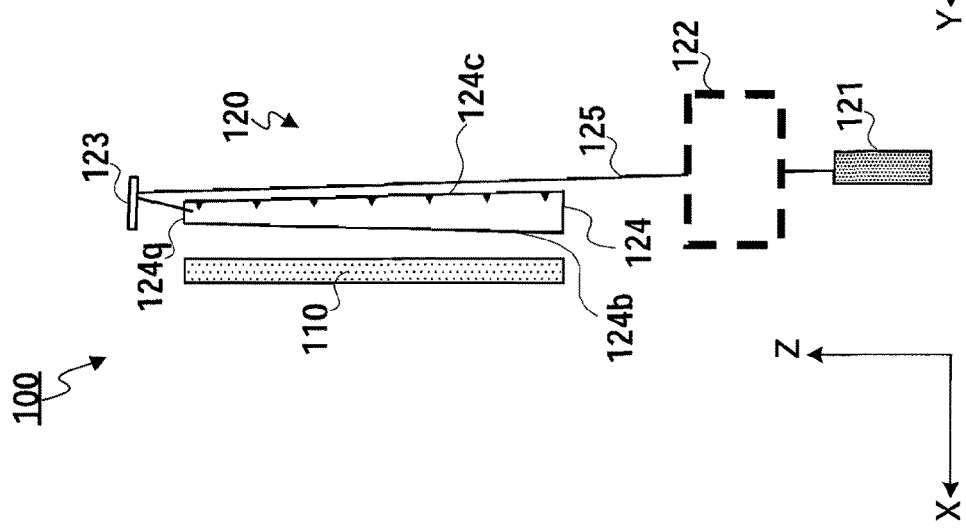

SURFACE LIGHT EMITTING APPARATUS EMITTING LASER LIGHT

CROSS REFERENCE TO RELATED APPLICATIONS

This application claims the benefit of U.S. provisional application Ser. No. 61/038,253, filed on Mar. 20, 2008, which is incorporated herein by reference in its entirety.

BACKGROUND OF THE INVENTION

1. Field of the Invention

The present invention relates to a surface light emitting apparatus emitting laser light, and more particularly, to a method for illuminating uniformly a backlight panel of a laser display by means of coherent laser beam shaping and a refractive optics.

2. Description of the Related Art

In recent years the need for flat panel displays has increased, in applications such as laptop screens, cellular phones screen and other portable devices, desk-top monitors, TV, etc. With the emergence of light valve type displays (e.g., liquid crystal displays (LCDs)) as one of the leader technologies in the flat panel industry, efforts are being made on improving backlighting: emitters as well as lighting techniques. The requirements on emitting materials include high brightness, efficiency, contrast and accurate RGB chromaticity, while device technology requires factors such as thin form, scalability (large to micro-displays), and low cost.

Until now, backlighting relied on broadband emitters such as fluorescent lamps as they are very bright and efficient white light emitters. However, their broad spectrum requires that most of the light generated be filtered out because it is at the wrong wavelength. About 70% of the light is thusly thrown away and the filtering technology involved to obtain the correct RGB TV colors is complex and expensive. In addition to decreasing the overall efficiency of the process, the unused emission results in undesirable heating of the display, triggering a search for alternatives.

With the recent development of efficient, high power blue, green and red laser sources, laser-based backlighting is emerging as a possible solution. These lasers provide narrow spectrum at the RGB TV colors, eliminating the need of complex filtering technology, and can be packaged into small size units, making them suitable for flat panel displays. In addition to being more energy efficient than lamp-based backlights, another obvious advantage of laser backlights is much broader color gamut coverage that gives much more vivid color displays. They also provide a more environmentally friendly alternative to mercury-based lamps.

However, laser light also differs with lamps in that it has different radiometric properties: laser light emits in a determined direction and generally has a Gaussian intensity profile, whereas lamps are Lambertian emitters (i.e. emit uniformly in all directions). Therefore new light shaping techniques adapted to laser light need to be developed in order to use efficiently laser sources in backlighting applications. One requirement is to illuminate uniformly the back panel (light guide plate) of LCD displays with wasting as little light as possible.

One technique is to use a light-guide (e.g., optical fiber) leaking light all along a side of the back panel, taking advantage of the possibility of efficiently coupling laser light into a fiber. However the "leaks" need to be carefully controlled to obtain uniform illumination while not wasting unused light (all light needs to have been leaked within the back panel at an incidence surface that is an end face of the back panel). This can lead to a high degree of complexity in design and fabrication. It is desirable to achieve a simpler design where uniformity can be more easily controlled while keeping high efficiency, and that for any sizes (small and large displays).

SUMMARY OF THE INVENTION

Therefore, it is an object of the present invention to provide a surface light emitting apparatus capable of providing uniform illumination while efficiently using a laser light.

To achieve the above-mentioned object, the present invention provides a surface light emitting apparatus comprising: a light source section that includes at least one light source which emits laser beam; an optical guiding section that guides from an incidence surface of the optical guiding section the laser beam emitted from the light source section and emits the laser beam from a radiation surface of the optical guiding section; and an optical element section that includes at least one beam shaping optical element with a powered surface which converts an intensity distribution of the laser beam emitted from the light source section at the incidence surface of the optical guiding section to a uniform intensity distribution. Preferably, the optical element has a powered surface that converts an intensity distribution of the laser beam emitted from the light source section in a longitudinal direction of the incidence surface of the optical guiding section to a uniform intensity distribution.

BRIEF DESCRIPTION OF THE DRAWINGS

FIG. 1A is a block diagram illustrating a schematic structure of a flat panel display including a surface light emitting apparatus according to one embodiment of the present invention;

FIG. 1B is a schematic diagram for illustrating the principle of laser beam shaping according to the present embodiment;

FIG. 1C is a schematic diagram illustrating a Gaussian intensity profile before the beam shaping;

FIG. 1D is a schematic diagram illustrating a flat-top profile after the beam shaping;

DETAILED DESCRIPTION OF THE PREFERRED EMBODIMENT

Figures 2A, 2B:
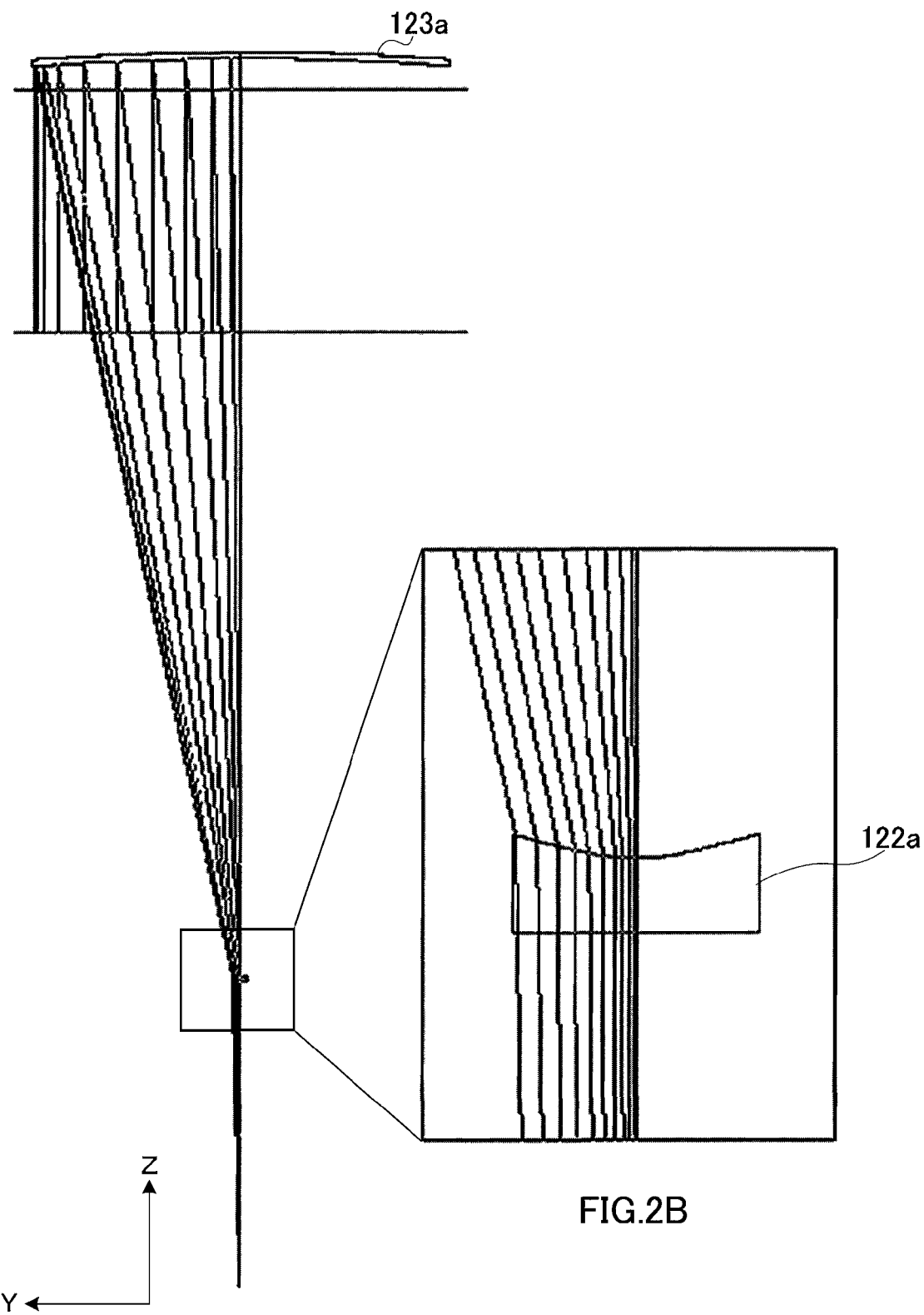
FIG. 2A is a diagram showing an example of a simulation result for illustrating the principle of the laser beam shaping according to the present embodiment.
FIG. 2B is an enlarged view of the main portion of FIG. 2A.

An embodiment of the present invention will be described below with reference to the drawings.

FIGS. 1A-1D illustrates a schematic layout of a back-lit panel using laser light and principle of coherent beam shaping for uniform illumination of back panel (light guide plate). The solutions to make the design compact are not represented in this illustration.

More specifically, FIG. 1A is a block diagram illustrating a schematic structure of a flat panel display including a surface light emitting apparatus according to one embodiment of the present invention; FIG. 1B is a schematic diagram for illustrating the principle of laser beam shaping according to the present embodiment; FIG. 1C is a schematic diagram illustrating a Gaussian profile before the beam shaping; and FIG. 1D is a schematic diagram illustrating a flat-top profile after the beam shaping.

As shown in FIG. 1A, flat panel display 100 mainly comprises display panel 110 and surface light emitting apparatus 120. Display panel 110 is, for example, a LCD panel, and includes several components (not shown), such as polarizing plate, liquid crystal cells, and a color filter. Flat panel display 100 allows a planar laser light emitted from surface light emitting apparatus 120 to enter display panel 110, and makes use of the transmission and blocking phenomenon of light that occurs in display panel 110 to display an image.

Surface light emitting apparatus 120 mainly comprises laser source section (hereinafter may also be simply referred to as "laser") 121, beam shaping section 122, collimating mirror 123, and optical guiding section 124. Beam shaping section 122 is one of the features of the present invention and described in detail below. Collimating mirror 123 is, for example, a conical collimating mirror. Optical guiding section 124 functions as a back panel. Optical guiding section 124 guides laser light 125 from incidence surface 124a and emits laser light from radiation surface 124b, emitting light from the entire panel surface. In addition to this function of guiding the entered laser light, optical guiding section 124 also functions as a diffuser to diffuse the entered laser light. Note that in this embodiment, the lateral and longitudinal directions of incidence surface 124a of optical guiding section 124 represent the X-axis and the Y-axis, respectively, and the direction perpendicular to the X- and Y-axis represents the Z-axis, as shown in FIGS. 1A and 1B.

The present invention is a technique for illuminating uniformly the back panel (optical guiding section 124) of, for example, a flat screen LCD type of display of small and large sizes (e.g., but not limited to, 5" to 32" panels) using lasers 121 as light sources. This technique uses optical elements (beam shaping section 122) with powered surfaces, that is, refractive or reflective optics, and therefore it is called "coherent" beam shaping. The method is to shape the laser beam with a Gaussian intensity profile (FIG. 1C) into the laser beam with a flat-top profile (FIG. 1D) using these elements (beam shaping section 122) and direct the shaped laser beam, so that the laser beam can be used to homogeneously illuminate a diffuser (i.e., optical guiding section 124) parallel to LCD panel 110 in a flat screen configuration, as shown schematically in, for instance, FIGS. 1A and 1B. The laser light propagates along back side 124c of the back panel (optical guiding section 124). The laser beam is shaped (and expanded) in one direction only while the other direction remains unaltered in order to produce a long thin uniform line along the longitudinal direction of incidence surface 124a of the back panel. For example, as can be seen in FIG. 1B, the illumination is uniform in direction 131 indicated by the arrow. Note that if the divergence of the laser is large, the other (unshaped, Gaussian) dimension may be collimated with a cylindrical lens to keep the line of light thin. Then the shaped beam is reflected by collimating mirror 123 to illuminate uniformly the diffusive back panel (optical guiding section 124). The propagation of the laser light can be made almost parallel to back side 124c of the back panel. Therefore, unlike in a projection display or tube where the light source is perpendicular to the screen, the display remains thin.

Optical guiding section 124 will now be described, followed by a detail description of beam shaping section 122. As mentioned above, optical guiding section 124 guides laser light 125 from incidence surface 124a and emits laser light from radiation surface 124b, emitting light from the entire panel surface. Optical guiding section 124 is made of, for example, polymethylmethacrylate (PMMA), polycarbonate (PC), or cycloolefin copolymer (COP). Optical guiding section 124 also has, for example, a light-diffusing layer disposed on its radiation surface 124b and a reflective layer disposed on its back side opposed to radiation surface 124b. The light-diffusing layer is made of a translucent resin including light-diffusing material. As the light-diffusing layer, for example, polyethylene terephthalate material whose surface has fine irregularity (convexoconcave) may be used, or white ink that diffusely reflects light may be printed on radiation surface 124b. In such cases, the degree of diffusion of the light-diffusing layer can be varied by adjusting the magnitude of the fine irregularity or the diameters of individual dots by white ink. As the reflective layer, a metal film may be used, or a metal coating may be applied to the back side using, for instance, deposition methods. It should be noted that the distribution of the degree of diffusion on radiation surface 124b is such that the brightness of laser beam 125 to be emitted is uniform. Specifically, the light-diffusing layer provided on radiation surface 124b, has varying degree of diffusion depending on the distance from incidence surface 124a along the Z-axis direction in such a way that the brightness is uniform in the Z-axis direction. For example, if the larger the distance from incidence surface 124a, the larger the degree of diffusion, then the brightness in the Z-axis direction may be uniform. Laser light 125 incident on optical guiding section 124 propagates inside optical guiding section 124 while repeating total reflections, and is diffused at the light-diffusing layer disposed on radiation surface 124b. Consequently, a portion of the diffused laser light 125 is incident on radiation surface 124b at a smaller angle than a critical angle. This portion of the laser light exits uniformly from radiation surface 124b. As a result, optical guiding section 124 provides uniform illumination across its surface.

Figure 3B:
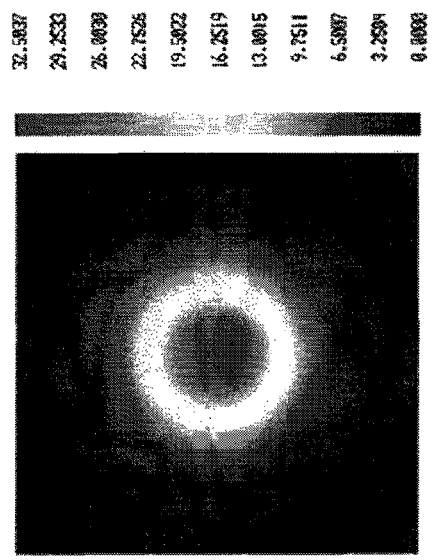
FIG. 3B is a diagram showing the intensity distribution of the input laser beam illustrated in FIG. 3A, viewed from the moving direction of the beam.
Figure 3A:
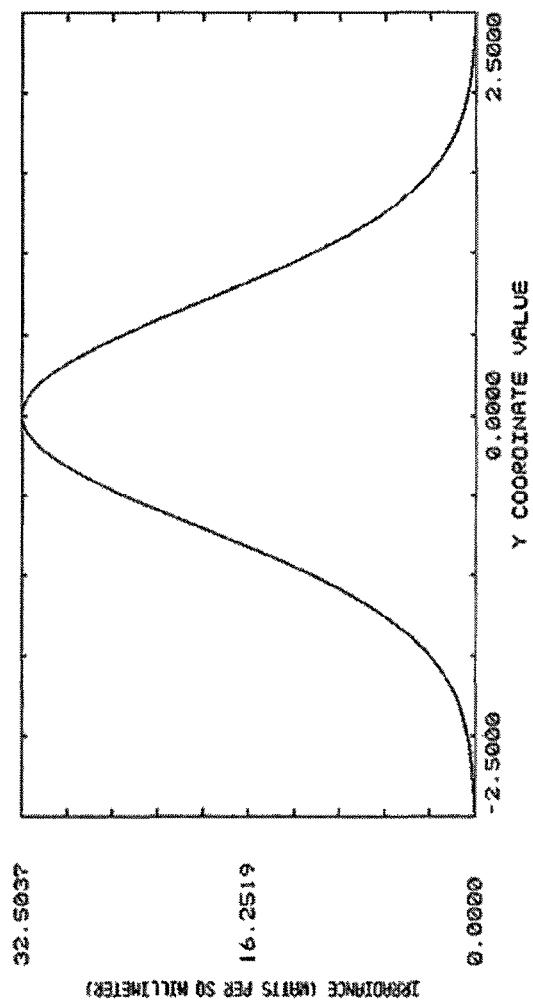
FIG. 3A is a diagram showing the intensity distribution of the input laser beam in the Y-axis direction in the simulation of FIG. 2A.
Figures 4A, 4B:
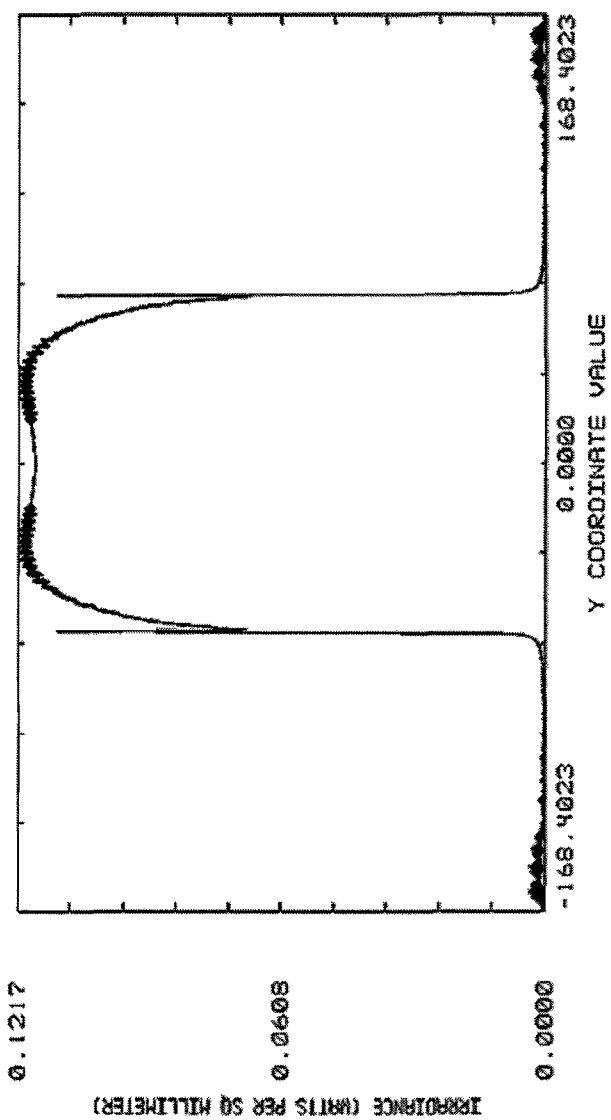
FIG. 4A is a diagram showing the intensity distribution of the laser beam in the Y-axis direction at the top of the back panel after the beam shaping in the simulation of FIG. 2A.
FIG. 4B is a diagram showing the intensity distribution of the laser beam illustrated in FIG. 4A, viewed from the moving direction of the beam.
Figure 5B:
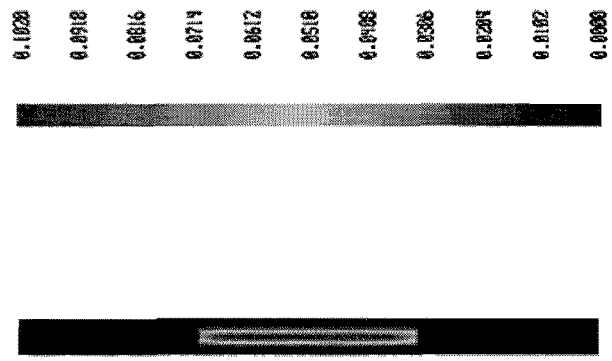
FIG. 5B is a diagram showing the intensity distribution of the laser beam illustrated in FIG. 5A, viewed from the moving direction of the beam.
Figure 5A:
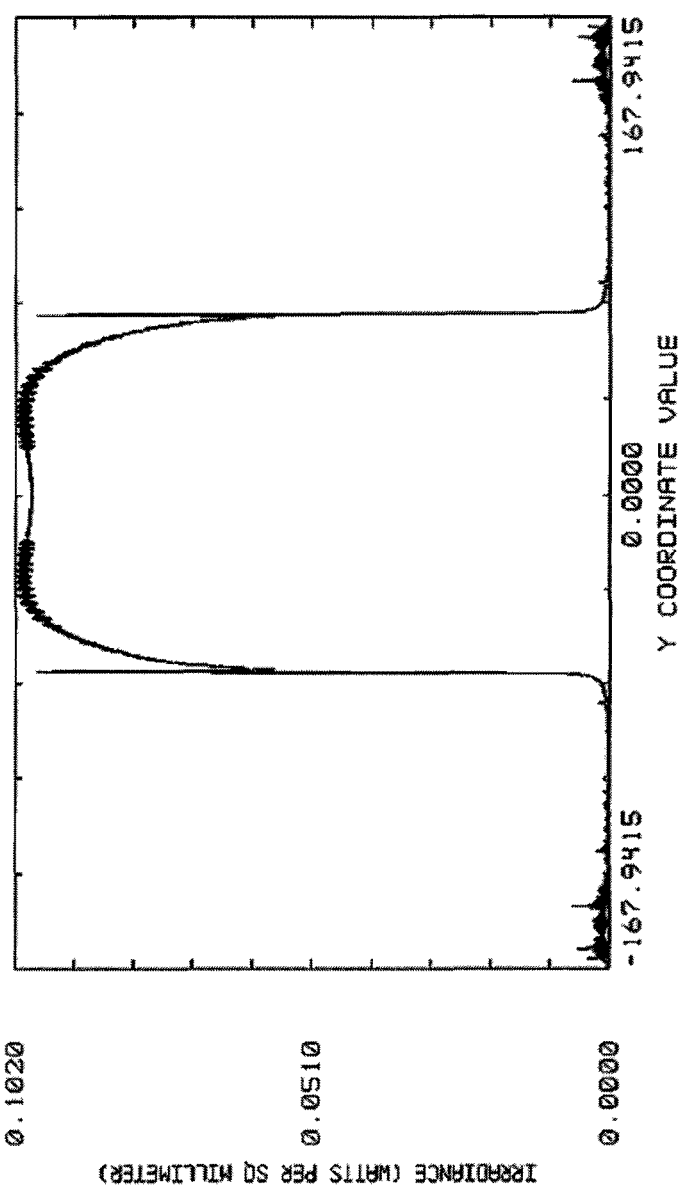
FIG. 5A is a diagram showing the intensity distribution of the laser beam in the Y-axis direction at the bottom of the back panel after the beam shaping in the simulation of FIG. 2A.

FIG. 2A is a diagram showing an example of a simulation result for illustrating the principle of the laser beam shaping according to the present embodiment, and FIG. 2B is an enlarged view of the main portion of FIG. 2A. FIG. 3A is a diagram showing the intensity distribution of the input laser beam in the Y-axis direction in the simulation of FIG. 2A, and FIG. 3B is a diagram showing the intensity distribution of the input laser beam illustrated in FIG. 3A, viewed from the moving direction of the beam. FIG. 4A is a diagram showing the intensity distribution of the laser beam in the Y-axis direction at the top (incidence surface 124a) of the back panel after the beam shaping in the simulation of FIG. 2A, and FIG. 4B is a diagram showing the intensity distribution of the laser beam illustrated in FIG. 4A, viewed from the moving direction of the beam. FIG. 5A is a diagram showing the intensity distribution of the laser beam in the Y-axis direction at the bottom (surface opposed to incidence surface 124a) of the back panel after the beam shaping in the simulation of FIG. 2A, and FIG. 5B is a diagram showing the intensity distribution of the laser beam illustrated in FIG. 5A, viewed from the moving direction of the beam.

Specifically, FIGS. 2A and 2B show, for example, 5" panel (106 mm line) layout comprising refractive coherent top-hat beam shaper (plano-aspheric refractive element, zoom) 122a and conical collimating mirror 123a for top-hat shaping in one direction. Furthermore, FIG. 3A shows the shape of the input laser beam; FIG. 4A shows the shape of the beam at the top (incidence surface 124a) of the back panel for top-hat beam shaping in ZEMAX™ POP analysis; and FIG. 5A shows the shape of the beam at the bottom (surface opposed to incidence surface 124a) of the back panel for top-hat beam shaping in ZEMAX™ POP analysis.

The principle of coherent beam shaping applied to back panel illumination is illustrated in more details in FIGS. 2A-5B in a simulation made with ray tracing software ZEMAX™. For the purpose of illustrating the method, the layout, shown in FIG. 2A, is simply composed of refractive beam shaper 122a and conical collimating mirror 123a, with no attention paid to compactness of the design. Refractive beam shaper 122a corresponds to an optical element with a powered surface that converts an intensity distribution of laser beam 125 emitted from light source section (laser) 121 at (or in a longitudinal direction of) incidence surface 124a of optical guiding section 124 to a uniform intensity distribution.

In this example we study a 4:3 5" screen (106 mm×80 mm): the dimension of the uniform line to obtain is 106 mm and that top-hat shape needs maintaining over a distance of 80 mm. Light source 121 is a 532 nm laser beam (green light) with a half divergence angle of 13 mrad. Such divergence was obtained by placing a fast converging lens in the path of a 1 mrad full divergence beam of a commercial laser.

The profile of the beam at different planes can be obtained by using the Physical Optics Propagation (POP) module of ZEMAX™ which propagates Gaussian beams. The beam at the laser output has a Gaussian profile shown in FIGS. 3A and 3B; high energy is concentrated at the center and the intensity rapidly decreases in the wings of the Gaussian curve. With this shape, the illumination of the screen would be more intense in the middle and weaker at the edges. Using an aperture to only use the center part of the Gaussian would be quite wasteful. Hence it needs to shape the beam into a flatter profile, e.g., a top-hat.

Shaping a Gaussian beam into a top-hat beam profile, or generally a flatter beam profile, is known in the art. For instance, the book edited by F. M. Dickey and S. C. Holswade, "Laser beam shaping—theory and techniques," Marcel Dekker, New York, 2000, describes general methods of top-hat beam shaping techniques. We can use such techniques to design beam shaper 122, here, cylindrical plano-aspherics refractive element 122a (FIG. 2B). The sag of the a sphere determines the shape of the beam. Lens 122a is cylindrical in order to shape the beam in one dimension only. FIGS. 4A-5B show the result of such beam shaping.

It is important to note that beam shaper 122 by itself shapes the beam only at one particular plane. The top-hat shape does not propagate. It requires additional design to maintain that top-hat shape over a distance, which is needed in order to illuminate uniformly the whole height of the back panel. Here, beam shaper 122 transforms the Gaussian into a top-hat at collimating mirror 123. This collimating mirror 123 is specially shaped to maintain the top hat shape (collimation of the beam) as the beam keeps propagating after the mirror over the height of the back panel (optical guiding section 124). In this example a conical collimating mirror 123a is used. The proper sag was calculated with ZEMAX™. The shapes of the beam at the top (incidence surface 124a) and at the bottom (surface opposed to incidence surface 124a) of the back panel are shown in FIGS. 4A, 4B and FIGS. 5A, 5B, respectively. Conical collimating mirror 123a performs as intended. Conical collimating mirror 123a can be made of light weight material (e.g., glass, polymer) with the powered surface coated with a reflective substrate (e.g., metal coating, like silver or aluminum).

Collimating mirror 123 can also be "Fresnelized" to be made thinner. This means that the sag of collimating mirror 123 is cut into zones akin to a Fresnel lens, so collimating mirror 123 can be flattened. For small displays, Fresnelizing collimating mirror 123 is optional as the sag can be sufficiently small that it does not require making collimating mirror 123 into a Fresnel mirror. This is the case for the example of FIGS. 2A and 2B for which the sag is not more than 10 mm. For large displays, collimating mirror 123 should be a Fresnel mirror, as the maximum sag is too large to have a convenient design otherwise (see the example below of FIGS. 14A and 14B). There are virtually no losses at collimating mirror 123.

In FIG. 4A (and FIG. 5A), the beam profile presents spikes (or fast oscillations). Some of these oscillations are an artifact of the POP analysis in ZEMAX™ which doesn't propagate well the beams at large angles (i.e., too big a departure from paraxial approximation). They are also due to the effect of diffraction by a sharp edge. Indeed, shaping a beam into a top-hat (i.e., rapid transition from maximum to minimum intensity) is equivalent to diffract the beam through a rectangular aperture. However, these fast oscillations will be averaged by the light diffusing properties of the back panel (optical guiding section 124) and the net effect is a uniform illumination of the screen (LCD panel 110).

FIGS. 6-9 show different configurations for coherent uniform illumination of flat screen back panel (optical guiding section 124).

In the example of FIGS. 2A and 2B, compactness of the design was not taken into account. For a flat panel display type, it is important to keep the optical path as compact as possible, that for any size of displays, small or large. Here we propose different methods to keep displays of any size thin and compact. The screens are proportioned 4:3 or 16:9. From this we can derive the size of the line of light, and a suitable working distance (this is the distance from laser 121 to collimating mirror 123). For instance, for a 4:3 10" screen, the length of the display is 200 mm and its height is 150 mm.

Figure 6:
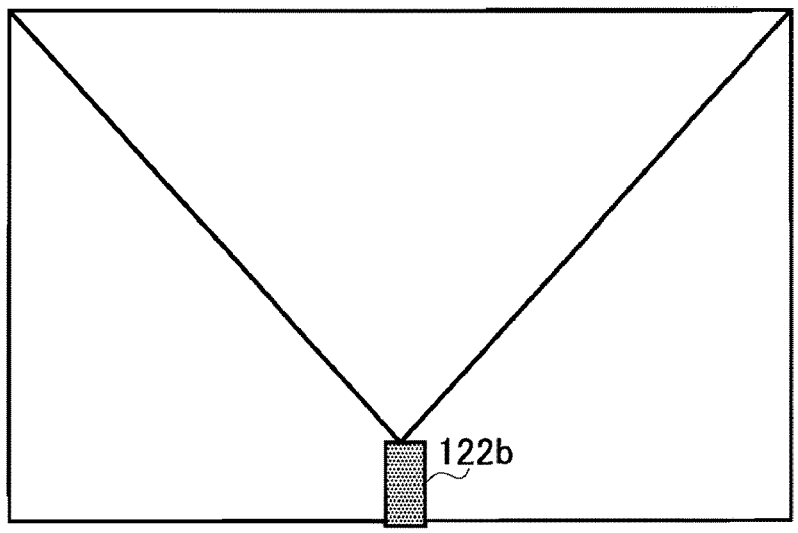
FIG. 6 is a schematic diagram illustrating one aspect of the present embodiment.

One solution is to shape the beam into a 200 mm line of light with a working distance no greater than 150 mm, as schematized in FIG. 6. Laser light has a certain divergence, i.e., the beam tends to expand. How fast it expands over a certain distance and what size it reaches depends on the characteristics of the laser. Most lasers are packaged to have a divergence of a few mrad and a spot diameter on the order of the mm. This means that the size of a freely propagating laser beam remains of a few mm over distances smaller than a meter. Therefore, in addition to uniform shaping, the laser beam needs to be expanded as part of the design as well. Beam shaping optics 122b (similar to optics 122a of FIGS. 2A and 2B) can serve as a beam expander, by modifying the aspheric surface and/or making the non-aspheric surface a powered surface, for instance. The beam expander can also be a separate optics, as it is easier to fabricate and implement. These elements are cylindrical optics as only one dimension is expanded.

Figure 7:
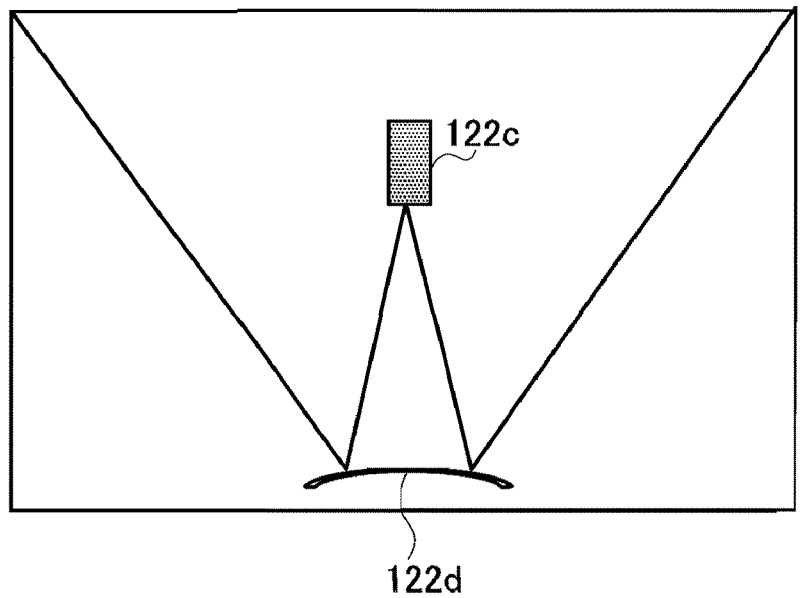
FIG. 7 is a schematic diagram illustrating another aspect of the present embodiment.
Figure 8:
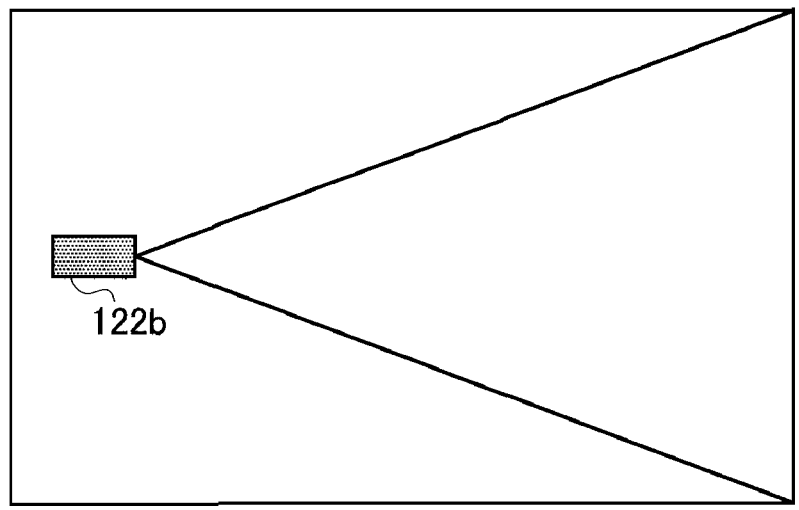
FIG. 8 is a schematic diagram illustrating yet another aspect of the present embodiment.

We can also increase the available working distance by using a reflective beam shaper instead of a refractive beam shaper. In this case, the path of the laser can be up to twice a long as it is folded to fit behind the back panel. This is the case schematized in FIG. 7. As in FIGS. 6 and 7, the shaping and expanding can be done with one optical element (FIG. 6) or with two separate optics (FIG. 7). In the latter case, the combination of refractive beam shaper 122c and reflective beam expander 122d (FIG. 7), or reflective beam shaper and refractive beam expander, or both can be made reflective, folding the path twice and further increasing the available working distance.

We can also dampen the constraints of the geometry by illuminating the back panel along its shortest side. This is the case schematized in FIG. 8. In this configuration, the angular spread of the line of light is smaller (therefore easier to achieve) and the working distance longer. Here again we can use refractive optics 122b (FIG. 8), or reflective beam shaper/expander and other combinations as described above (similar as FIG. 7).

Figure 9:
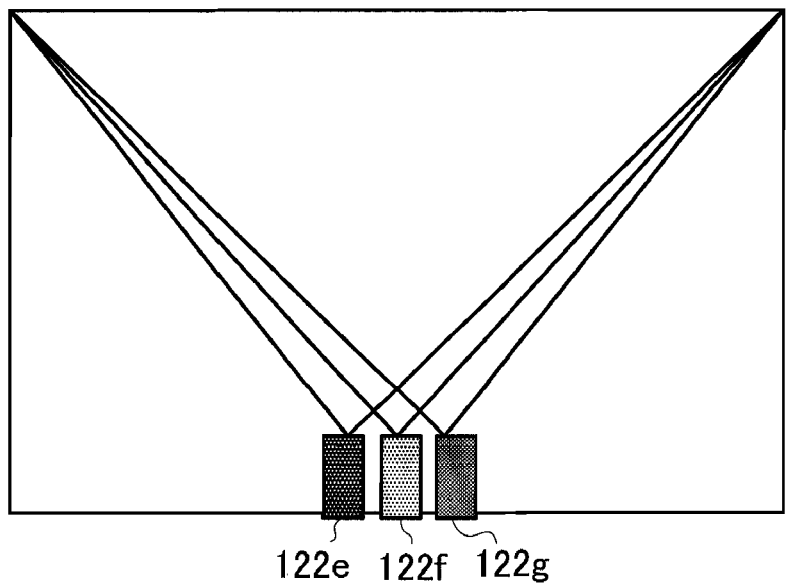
FIG. 9 is a schematic diagram illustrating yet another aspect of the present embodiment.

Finally, for this system, the three RGB colors are obtained with three separate lasers. Each beam would be shaped separately with corresponding beam shaper 122e, 122f, and 122g for simplicity of design and alignment (FIG. 9).

Figures 10A, 10B:
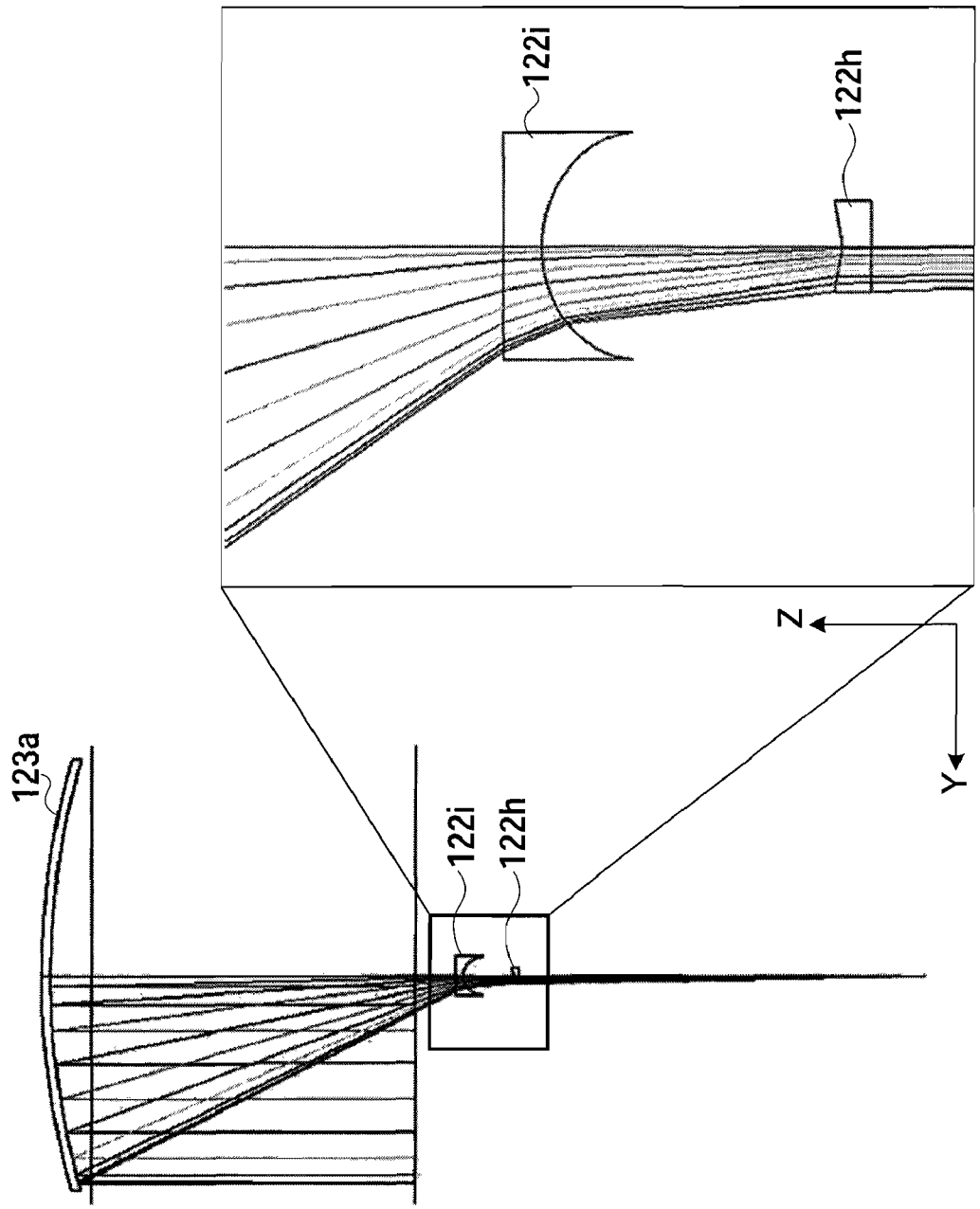
FIG. 10A is a diagram showing another example of a simulation result for illustrating the principle of the laser beam shaping according to the present embodiment.
FIG. 10B is an enlarged view of the main portion of FIG. 10A.
Figure 11A:
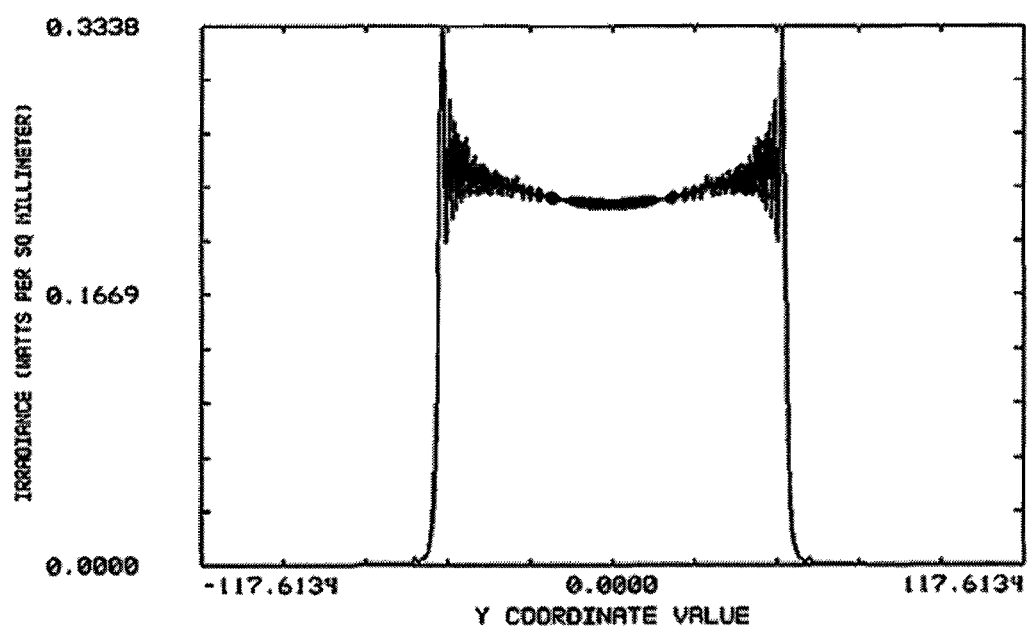
FIG. 11A is a diagram showing the intensity distribution of the laser beam in the Y-axis direction at the top of the back panel after the beam shaping in the simulation of FIG. 10A.
Figure 11B:
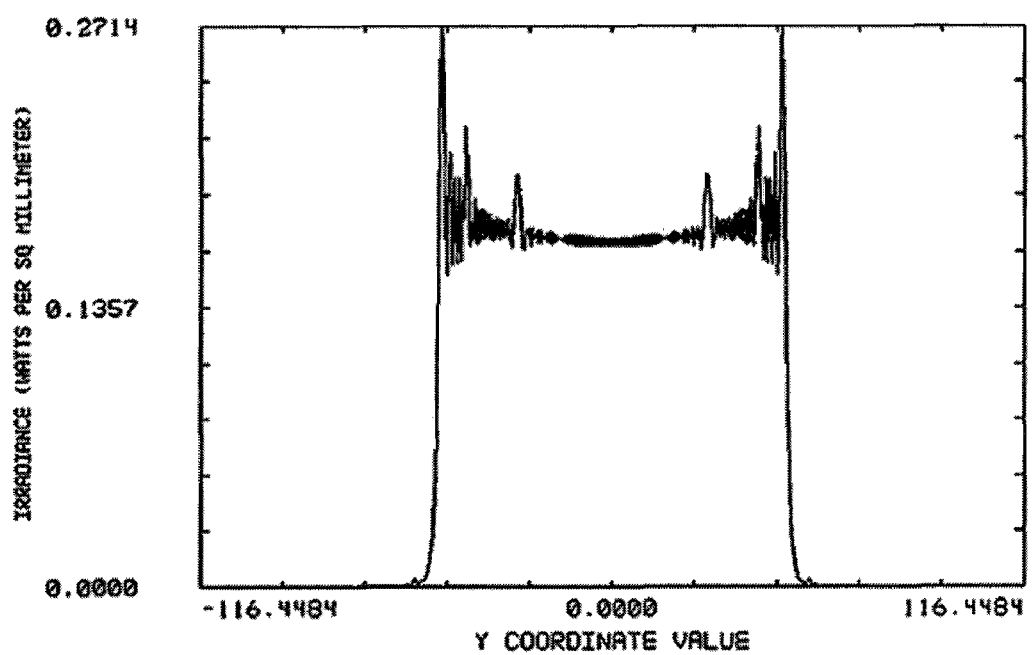
FIG. 11B is a diagram showing the intensity distribution of the laser beam in the Y-axis direction at the bottom of the back panel after the beam shaping in the simulation of FIG. 10A.

FIG. 10A is a diagram showing another example of a simulation result for illustrating the principle of the laser beam shaping according to the present embodiment; and FIG. 10B is an enlarged view of the main portion of FIG. 10A. FIG. 11A is a diagram showing the intensity distribution of the laser beam in the Y-axis direction after the beam shaping at the top (incidence surface 124a) of the back panel in the simulation of FIG. 10A; and FIG. 11B is a diagram showing the intensity distribution of the laser beam in the Y-axis direction after the beam shaping at the bottom (surface opposed to incidence surface 124a) of the back panel in the simulation of FIG. 10A. Specifically, FIGS. 10A and 10B show, for example, 4:3, 5" panel (106 mm line) layout comprising beam shaper 122h and beam expander (zoom) 122i and conical collimating mirror 123a for top-hat shaping in one direction. FIG. 11A shows the shape of beam at the top (incidence surface 124a) of the 5" panel with ZEMAX™ POP analysis. FIG. 11B shows the shape of beam at the bottom (surface opposed to incidence surface 124a) of the 5" panel with ZEMAX™ POP analysis. The spikes at the both ends are an artifact of the simulation due to ZEMAX™ POP module inability to handle large angles.

In FIGS. 10A-11B we give the ZEMAX™ simulation of an example of the configuration of FIG. 6A for the 4:3 5" screen of FIGS. 2A and 2B, 532 nm, 13 mrad half divergence laser beam of FIGS. 2A and 2B, and top-hat beam shaping. Here we use separate optics 122h and 122i for the uniform shaping and beam expanding, all cylindrical for beam shaping in one dimension.

FIGS. 10A and 10B represent the layout of the design. Beam shaper 122h is a custom plano-aspherics cylindrical lens in acrylic designed with ZEMAX™. Beam expander 122i is the LK1836L1 plano-concave cylindrical lens by Thorlabs (EFL=−9.7 mm). In FIGS. 10A and 10B, we see how we decreased the working distance compared to FIGS. 2A and 2B while maintaining the performances.

FIGS. 11A and 11B show beam profiles at the top (incidence surface 124a) and bottom (surface opposed to incidence surface 124a) of the back panel, respectively. Note that the maximum irradiance is slightly decreased at the bottom from that at the top of the screen. This is because beam in the other direction (the one that is not shaped) is not collimated and the beam keeps diverging. This can be solved by collimating that other direction with a cylindrical lens.

This design can be scaled up to a 4:3 32" screen (710 mm×530 mm), for the same 532 nm, 13 mrad half-divergence laser beam. The beam shaper 122h is similar and the beam expander 122i is the same as the ones used in FIGS. 10A and 10B. The layout and result of the ZEMAX™ simulation are given in FIGS. 12A, 12B and FIGS. 13A, 13B.

Figure 12A:
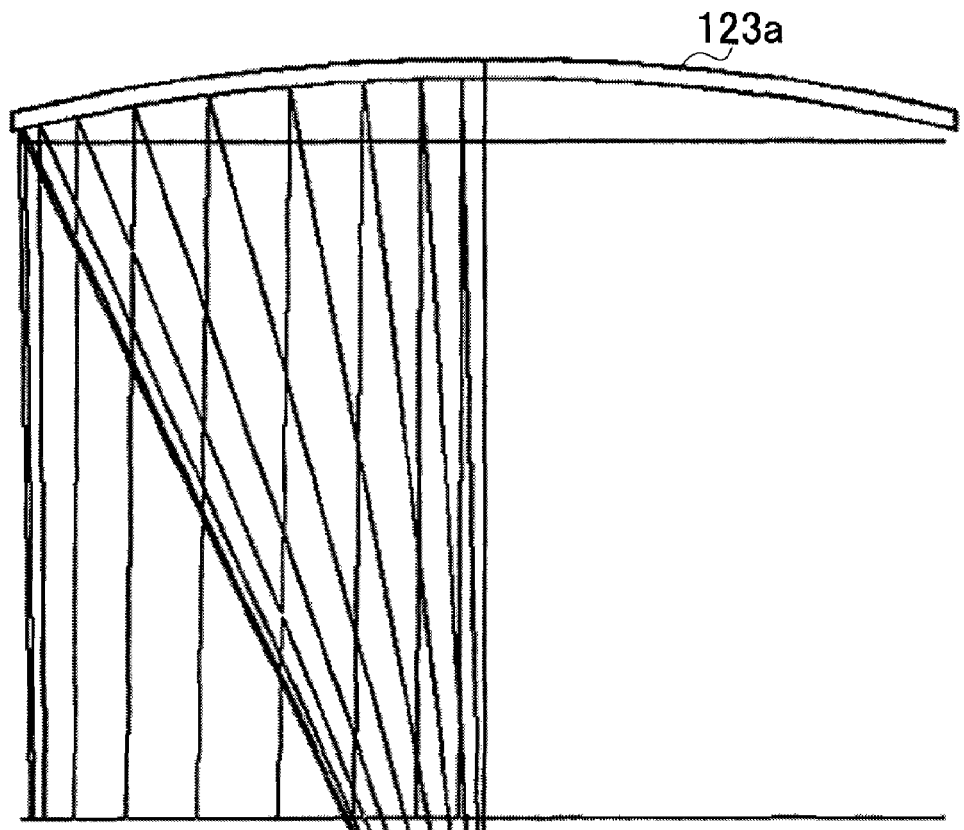
FIG. 12A is a diagram showing yet another example of a simulation result for illustrating the principle of the laser beam shaping according to the present embodiment.
Figure 12B:
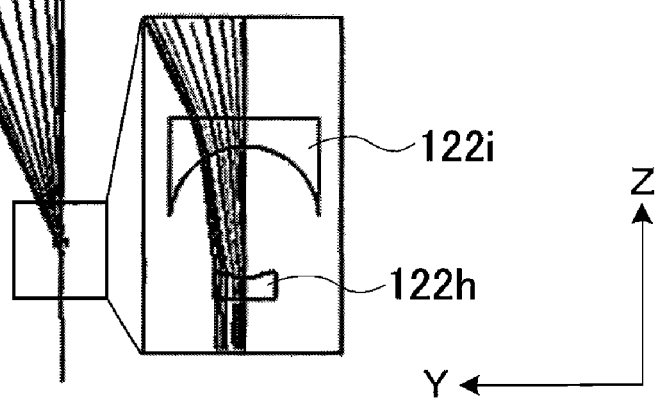
FIG. 12B is an enlarged view of the main portion of FIG. 12A.
Figure 13A:
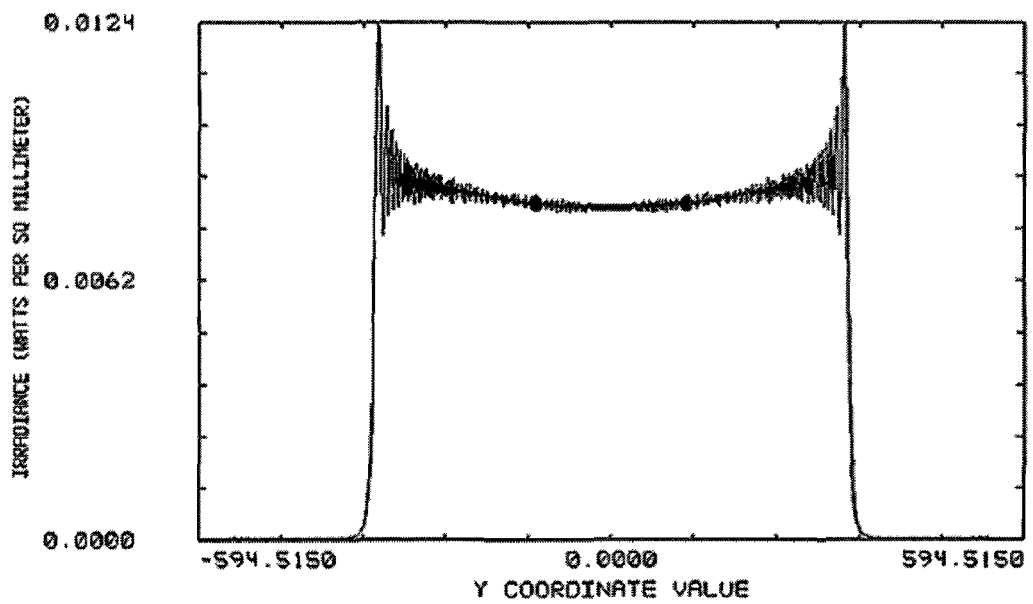
FIG. 13A is a diagram showing the intensity distribution of the laser beam in the Y-axis direction at the top of the back panel after the beam shaping in the simulation of FIG. 12A.
Figure 13B:
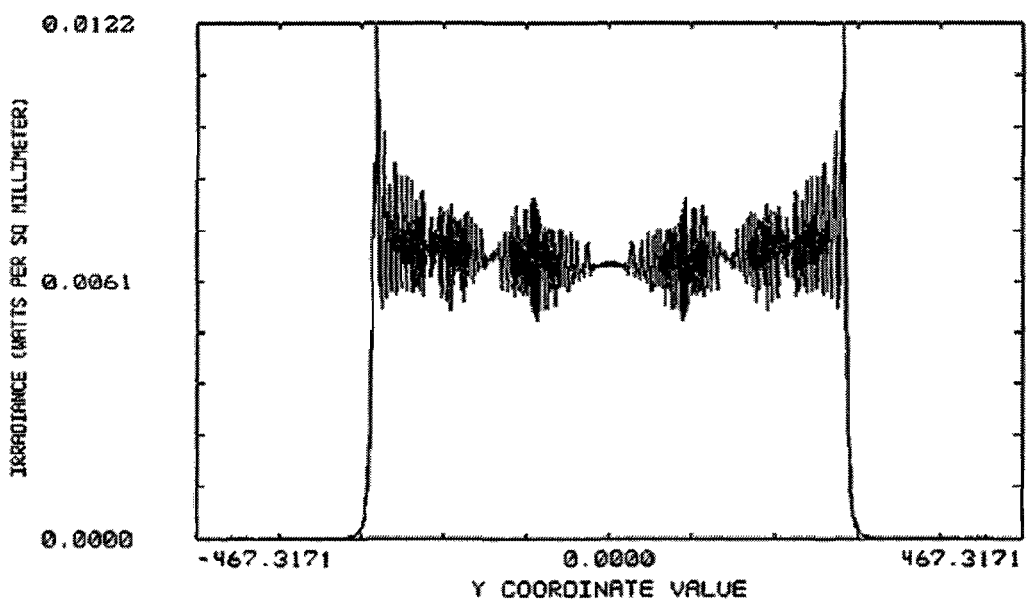
FIG. 13B is a diagram showing the intensity distribution of the laser beam in the Y-axis direction at the bottom of the back panel after the beam shaping in the simulation of FIG. 12A.

More specifically, FIGS. 12A, 12B and FIGS. 13A, 13B show 4:3, 32" panel (710 mm line) design layout and performance using similar beam shaper 122h and same beam expander 122i as in FIGS. 10A and 10B, and conical collimating mirror 123a. The maximum sag of this mirror 123a is not more than 45 mm. FIGS. 13B and 13B show beam profiles at the top (incidence surface 124a) and bottom (surface opposed to incidence surface 124a) of the back panel, respectively.

For such a screen, the maximum sag of conical collimating mirror 123a is 45 mm, which is not convenient to fabricate. It can be made thinner by making it a Fresnel-like mirror, as explained above.

For instance, mirror 123a of FIG. 12A is cut into zones so that the maximum sag of each zone is kept under 3 mm (note: not optical Fresnel zones). The results of this "Fresnelization" is shown in FIGS. 14A, 14B and FIGS. 15A, 15B. Due to the diffraction caused by the sharp edges introduced by "cutting" mirror 123b, we introduced some fast oscillations to the top hat. Again, these can be averaged and smoothed out by the diffusing surface (radiation surface 124*b*) of the back panel. These can also be reduced by cutting the mirror in grooves proportional to Fresnel zones.

Figures 14A, 14B:
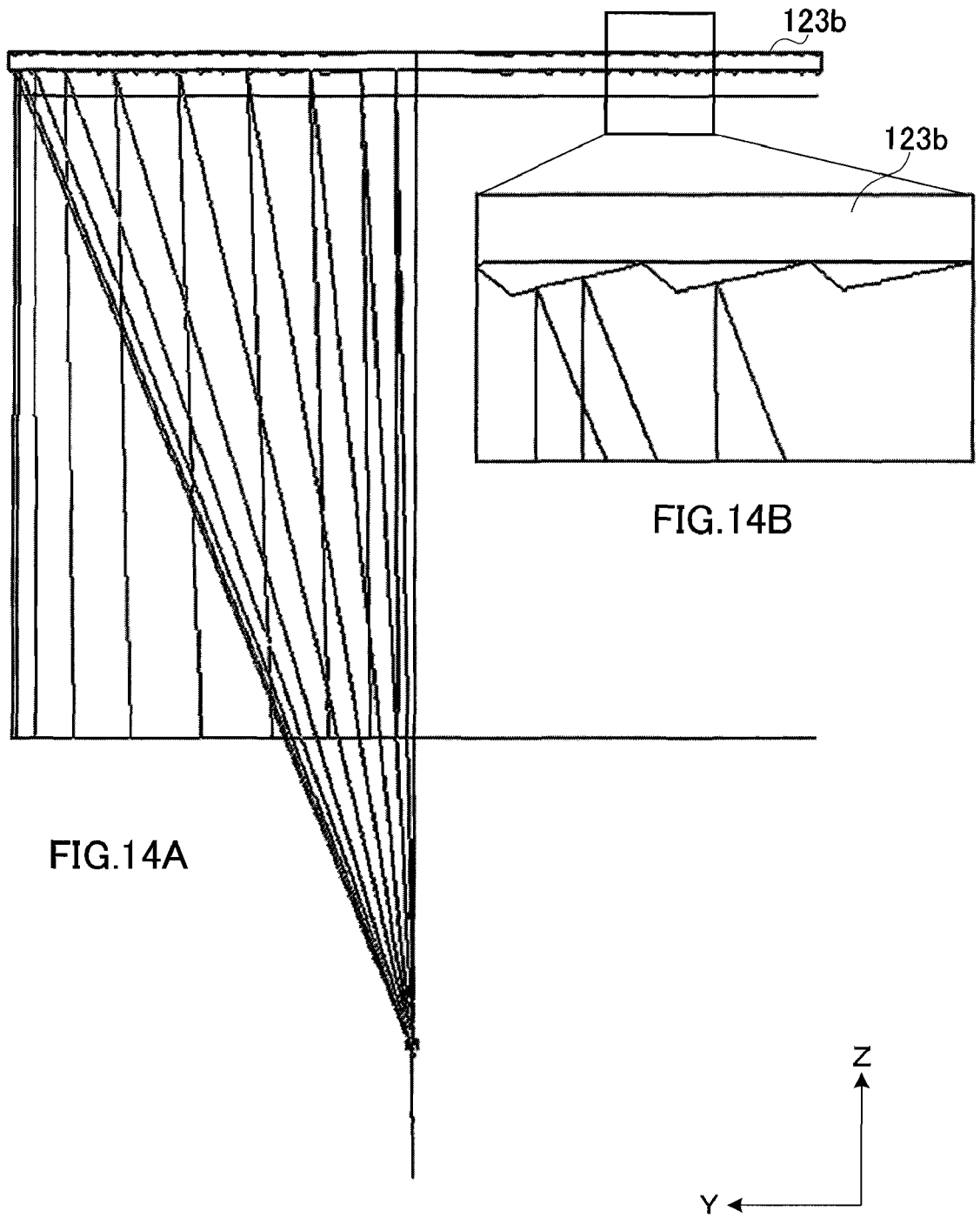
FIG. 14A is a diagram showing yet another example of a simulation result for illustrating the principle of the laser beam shaping according to the present embodiment.
FIG. 14B is an enlarged view of the main portion of FIG. 14A.
Figure 15A:
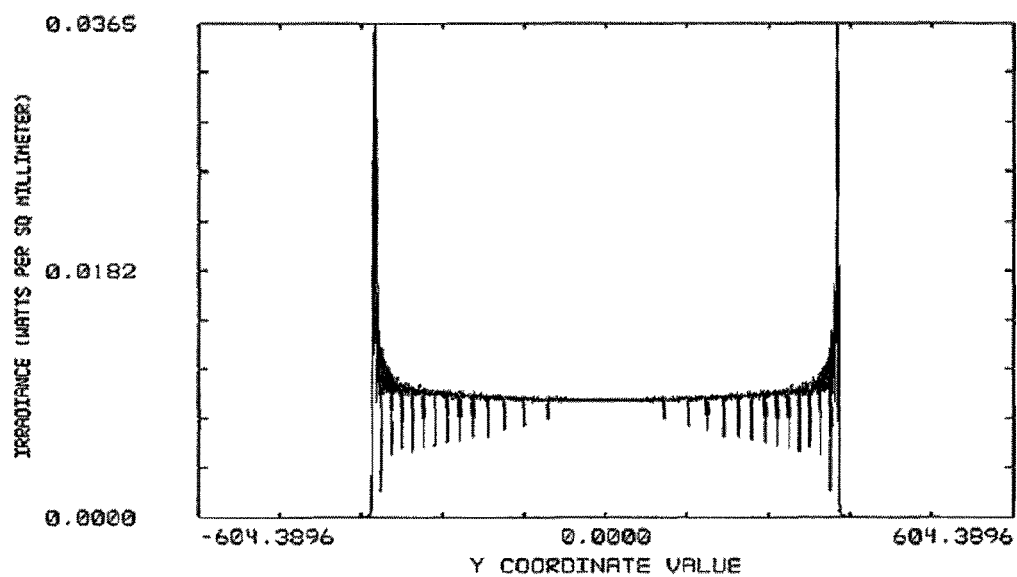
FIG. 15A is a diagram showing the intensity distribution of the laser beam in the Y-axis direction at the top of the back panel after the beam shaping in the simulation of FIG. 14A.
Figure 15B:
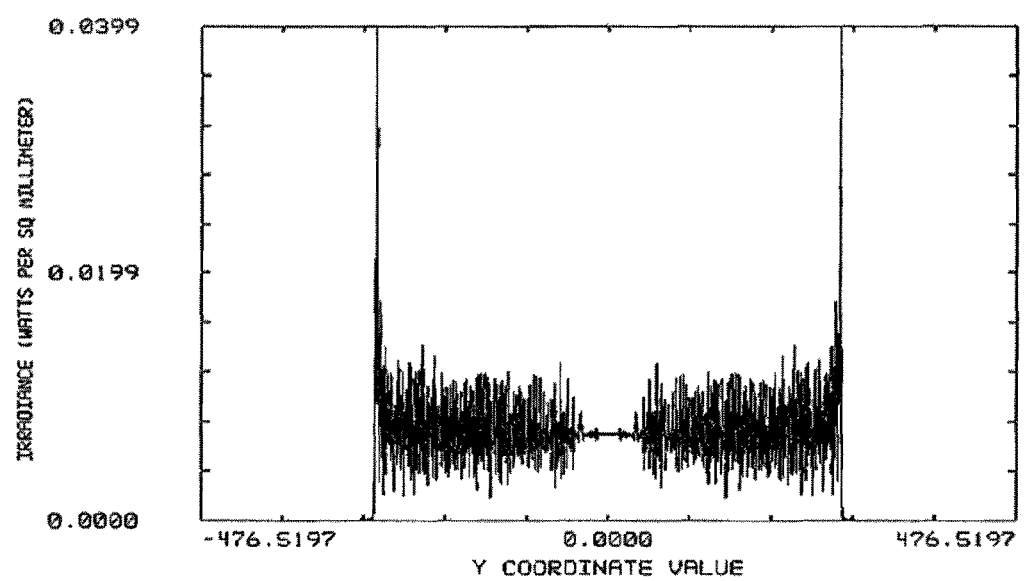
FIG. 15B is a diagram showing the intensity distribution of the laser beam in the Y-axis direction at the bottom of the back panel after the beam shaping in the simulation of FIG. 14A.

More specifically, FIGS. 14A, 14B and FIGS. 15A, 15B show a design layout and performance for the 4:3, 32" panel of FIGS. 12A and 12B where collimating mirror 123*b* has been "Fresnelized" into a 3 mm sag mirror (detail in FIG. 14B). The top beam profile in FIG. 15A is at the top (incidence surface 124*a*) of the back panel, and the top beam profile in FIG. 15B is at the bottom (surface opposed to incidence surface 124*a*) of the back panel. As mentioned above, the fast variations on the top-hat profile are due to diffraction phenomena and will be averaged out on the diffusive surface (radiation surface 124*b*) of the back panel. The big spikes at the both ends can be cropped out.

The configurations we described above make for a simple and efficient solution for laser back-lit flat panel displays. It allows scalability: it works for small displays as well as large ones. All optical elements can be readily manufactured and are inexpensive.

What is claimed is:

1. A surface light emitting apparatus comprising:
    a light source section that includes at least one light source which emits a laser beam;
    an optical guiding section that comprises an incidence surface and a radiation surface, guides the laser beam received at the incidence surface, and emits the guided laser beam through the radiation surface; and
    an optical element section that includes at least one beam shaping optical element configured for shaping the laser beam, the beam shaping optical element having a refractive aspheric lens, the refractive aspheric lens being configured to convert an intensity distribution of the laser beam emitted from the light source section to a more uniform intensity distribution at the incidence surface of the optical guiding section.

2. The surface light emitting apparatus according to claim 1, wherein the refractive aspheric lens converts the intensity distribution of the laser beam emitted from the light source section to the more uniform intensity distribution in a longitudinal direction of the incidence surface of the optical guiding section.

3. The surface light emitting apparatus according to claim 1, wherein the optical element section further includes at least one beam expanding optical element that expands divergence of the laser beam.

4. The surface light emitting apparatus according to claim 3, wherein the beam shaping optical element and the beam expanding optical element are combined on a same piece of optics.

5. A surface light emitting apparatus comprising:
    a light source section that includes at least one light source which emits a laser beam;
    an optical guiding section that comprises an incidence surface and a radiation surface, guides the laser beam received at the incidence surface, and emits the guided laser beam through the radiation surface; and
    an optical element section that includes at least one beam shaping optical element configured for shaping the laser beam, the beam shaping optical element having a powered surface, the powered surface being configured to convert an intensity distribution of the laser beam emitted from the light source section to a more uniform intensity distribution at the incidence surface of the optical guiding section,
    wherein the optical element section further includes at least one collimating optical element that collimates the laser beam after the laser beam is shaped by the beam shaping optical element.

6. The surface light emitting apparatus according to claim 5, wherein the collimating optical element is a mirror that is folded into zones as a Fresnel optical element.

7. A surface light emitting apparatus comprising:
    a light source section that includes at least one light source that emits a laser beam;
    an optical guiding section that comprises an incidence surface and a radiation surface, guides the laser beam received at the incidence surface, and emits the guided laser beam through the radiation surface; and
    an optical element section that includes at least one beam shaping optical element configured for shaping the laser beam, the beam shaping optical element having a powered surface, the powered surface being configured to convert an intensity distribution of the laser beam emitted from the light source section to a more uniform intensity distribution at the incidence surface of the optical guiding section,
    wherein the beam shaping optical element is reflective.

* * * * *